(12) United States Patent
Colton et al.

(10) Patent No.: US 9,122,650 B1
(45) Date of Patent: Sep. 1, 2015

(54) WEB SERVER BASED ON THE SAME PARADIGMS AS WEB CLIENTS

(75) Inventors: Paul Colton, Hillsborough, CA (US); Uri Sarid, Menlo Park, CA (US); Kevin Edward Lindsey, Benbrook, TX (US)

(73) Assignee: Appcelerator, Inc., Mountain View, CA (US)

( * ) Notice: Subject to any disclaimer, the term of this patent is extended or adjusted under 35 U.S.C. 154(b) by 711 days.

(21) Appl. No.: 12/270,817

(22) Filed: Nov. 13, 2008

Related U.S. Application Data

(60) Provisional application No. 60/988,070, filed on Nov. 14, 2007.

(51) Int. Cl.
 *G06F 17/20* (2006.01)

(52) U.S. Cl.
 CPC ..................... *G06F 17/20* (2013.01)

(58) Field of Classification Search
 CPC ........................................... G06F 17/20
 USPC ........................................ 715/239
 See application file for complete search history.

(56) References Cited

U.S. PATENT DOCUMENTS

| | | | |
|---|---|---|---|
| 6,192,382 B1 | 2/2001 | Lafer et al. | |
| 6,981,215 B1 | 12/2005 | Lindhorst et al. | |
| 7,047,318 B1 | 5/2006 | Svedloff | |
| 7,269,636 B2 | 9/2007 | McCollum et al. | |
| 7,308,648 B1 | 12/2007 | Buchthal et al. | |
| 7,389,330 B2 | 6/2008 | Dillon et al. | |
| 7,454,526 B2 * | 11/2008 | Brown et al. | 709/246 |
| 7,596,620 B1 | 9/2009 | Colton et al. | |
| 7,707,547 B2 | 4/2010 | Colton et al. | |
| 7,725,530 B2 * | 5/2010 | Sah et al. | 709/203 |
| 7,844,958 B2 | 11/2010 | Colton et al. | |
| 7,958,232 B1 | 6/2011 | Colton et al. | |
| 7,958,493 B2 | 6/2011 | Lindsey et al. | |
| 2001/0037359 A1 | 11/2001 | Mocket et al. | |
| 2002/0007393 A1 | 1/2002 | Hamel | |
| 2002/0016828 A1 | 2/2002 | Daugherty et al. | |
| 2002/0069255 A1 | 6/2002 | Dinovo | |
| 2003/0088687 A1 | 5/2003 | Begeja et al. | |
| 2003/0226110 A1 * | 12/2003 | Scheering | 715/513 |
| 2004/0061713 A1 * | 4/2004 | Jennings | 345/700 |
| 2004/0066410 A1 | 4/2004 | Lindhorst et al. | |
| 2004/0167784 A1 | 8/2004 | Travieso et al. | |
| 2004/0167876 A1 | 8/2004 | Salerno et al. | |
| 2004/0201618 A1 | 10/2004 | Alderson | |
| 2004/0250262 A1 | 12/2004 | Irassar et al. | |
| 2004/0268303 A1 | 12/2004 | Abe et al. | |
| 2005/0027823 A1 * | 2/2005 | Rana | 709/219 |

(Continued)

OTHER PUBLICATIONS

Portions of the prosecution history of U.S. Appl. No. 11/735,428.

(Continued)

*Primary Examiner* — Kavita Padmanabhan
*Assistant Examiner* — Tionna Burke
(74) *Attorney, Agent, or Firm* — Staniford Tomita LLP

(57) ABSTRACT

A method, system, Web-environment and computer program product for using browser paradigms on a server is disclosed herein. The invention for the parsing of an HTML document to create an HTML DOM on a server. The JavaScript of the document is parsed and interpreted on the server to create a parsed JavaScript, which designated to operate on the server. The HTML DOM is modified with the parsed JavaScript on the server.

20 Claims, 11 Drawing Sheets

(56) References Cited

U.S. PATENT DOCUMENTS

| | | | |
|---|---|---|---|
| 2005/0198365 A1* | 9/2005 | Wei | 709/237 |
| 2005/0278641 A1 | 12/2005 | Monsour et al. | |
| 2006/0259592 A1 | 11/2006 | Angeline | |
| 2006/0277250 A1 | 12/2006 | Cherry et al. | |
| 2007/0011650 A1 | 1/2007 | Hage et al. | |
| 2007/0073739 A1 | 3/2007 | Jennings et al. | |
| 2007/0143672 A1 | 6/2007 | Lipton et al. | |
| 2007/0174419 A1 | 7/2007 | O'Connell et al. | |
| 2007/0214239 A1 | 9/2007 | Mechkov et al. | |
| 2007/0240032 A1 | 10/2007 | Wilson | |
| 2007/0250513 A1 | 10/2007 | Hall et al. | |
| 2007/0288858 A1 | 12/2007 | Pereira et al. | |
| 2008/0104025 A1* | 5/2008 | Dharamshi et al. | 707/3 |
| 2008/0243475 A1 | 10/2008 | Everhart et al. | |
| 2008/0244586 A1 | 10/2008 | Hopp | |
| 2009/0106413 A1 | 4/2009 | Salo et al. | |

OTHER PUBLICATIONS

Portions of the prosecution history of U.S. Appl. No. 12/270,868.
Portions of the prosecution history of U.S. Appl. No. 12/273,539.
Portions of the prosecution history of U.S. Appl. No. 12/275,182.
Portions of the prosecution history of U.S. Appl. No. 12/275,213.
Portions of the prosecution history of U.S. Appl. No. 12/276,327.
Portions of the prosecution history of U.S. Appl. No. 12/276,336.
Portions of the prosecution history of U.S. Appl. No. 12/276,337.
Portions of the prosecution history of U.S. Appl. No. 12/325,239.
Portions of the prosecution history of U.S. Appl. No. 12/325,268.
Portions of the prosecution history of U.S. Appl. No. 12/326,103.
Portions of the prosecution history of U.S. Appl. No. 12/326,110.
Portions of the prosecution history of U.S. Appl. No. 12/326,861.
Portions of the prosecution history of U.S. Appl. No. 12/326,891.
Portions of the prosecution history of U.S. Appl. No. 12/326,910.
Portions of the prosecution history of U.S. Appl. No. 12/327,330.
Portions of the prosecution history of U.S. Appl. No. 12/327,802.
Portions of the prosecution history of U.S. Appl. No. 12/334,434.
Portions of the prosecution history of U.S. Appl. No. 12/352,240.
Portions of the prosecution history of U.S. Appl. No. 12/563,159.
Portions of the prosecution history of U.S. Appl. No. 12/766,908.
Portions of the prosecution history of U.S. Appl. No. 12/955,881.
Portions of the prosecution history of U.S. Appl. No. 13/154,090.
Portions of the prosecution history of U.S. Appl. No. 13/175,570.
Portions of the prosecution history of U.S. Appl. No. 12/325,240.

* cited by examiner

Tasks To Do

Any Changes should be automatically saved to your database

New | Take out the trash | Add

☐ Book tickets

☐ Buy Milk

☐ This is another task

☐ This is a task

WEB SERVER BASED ON THE SAME PARADIGMS AS WEB CLIENTS

CROSS REFERENCE TO RELATED APPLICATION

This Application claims priority to U.S. Provisional Patent Application No. 60/988,070, filed on Nov. 14, 2008, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention is related to websites and software applications. More specifically, the present invention relates to rich Web sites and rich Internet applications.

2. Description of the Related Art

Prior to Rich Internet Applications, traditional Web applications involved a client-server architecture with all of the processing on the server side and the client-side used to display the HTML web-pages served by the server. Each time a user desired to view a new Web-page, a HTTP request was sent to the server and the requested Web-page was served to the Web browser on the client-side. Such a traditional system is shown in FIG. 1 with a Web-server 1000 on a server side receiving requests over the Internet 1005 from a Web-browser 1003 on a client-side.

Rich Internet Applications, such as Ajax, greatly improved on the traditional client-server architecture by allowing the client machine to dynamically render and partially refresh web pages based on an initial set of instructions from the server, user input, and small amounts of subsequent data dynamically requested from the server. As shown in FIG. 2, the client machine processes Ajax instructions to render a Web page for the user.

Early Web applications allowed a user's browser to send a request to a server. The server processed the request and responded to the browser with a Web page. When the user wanted to view a new page, another request was sent to the server and the server responded to the browser with a new Web page. Such a process resulted in a waste of bandwidth since much of the Web contents in the first Web page were also contained in the second web page. The need to resend the same information led to a much slower user interface of a Web application than that of a native application.

An emerging technology, called Ajax (Asynchronous and JavaScript XML), was developed for refreshing part of a page instead of refreshing the whole page on every interaction between the user and application. In an Ajax application, when a user submits a form in a page, a script program, usually a JavaScript program, resident on the Web browser receives the user's request and sends a XML (Extended Markup Language) HTTP (Hyper Text Transfer Protocol) request to the Web server in background so as to retrieve only the needed Web contents instead of the whole page and perform corresponding processing to partly refresh the page when receiving a response from the Web server. In this way, the application response time is shortened, because the amount of data exchanged between the Web browser and the Web server is greatly reduced. And the processing time of the Web server is saved because much of the processing is performed at the client side.

General definitions for terms utilized in the pertinent art are set forth below.

Ajax is the use of dynamic HTML, JavaScript and CSS to create dynamic and usually interactive Web sites and applications. A more detailed explanation of Ajax is set forth in Edmond Woychowsky, *AJAX, Creating Web Pages with Asynchronous JavaScript and XML*, Prentice Hall, 2007, which is hereby incorporated by reference in its entirety.

Applets or Java Applets are mini-executable programs named with the .class suffix and are placed on a Web page and provide interactive and multimedia uses.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Behavioral layer is the top layer and is the scripting and programming that adds interactivity and dynamic effects to a site.

Binding in a general sense is the linking of a library to an application program usually to prevent repetition of frequently utilized code.

Cascading Style Sheets (CSS) is a W3C standard for defining the presentation of Web documents.

Compiler is a computer program that translates a series of instructions written in one computer language into a resulting output in a different computer language.

Document Object Model (DOM) Element is an object contained in a Document Object Model (DOM). The term DOM is generally used to refer to the particular DOM held in the memory region being used by the Web browser. Such a DOM controls the Graphical Respondent Interface (GRI) or Graphical User Interface (GUI). The DOM is generated according to the information that the Web browser reads from the HTML file, and/or from direct JavaScript software instructions. Generally, there exists a unique DOM element for every unique HTML element. DOM elements are sometimes referred to as HTML/DOM elements, because the DOM element exists only because HTML code that was read by the Web browser listed some HTML element that had not previously existed, and thereby caused the Web browser to create that DOM element. Often specific elements of the greater set of HTML/DOM elements are identified by specifying an HTML/DOM checkbox element, or an HTML/DOM text input element. A more detailed explanation of the document object model is set forth in Jeremy Keith, *DOM Scripting, Web Design with JavaScript and the Document Object Model*, friends of, 2005, which is hereby incorporated by reference in its entirety.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

JSON is JavaScript Object Notation format, which is a way of taking data and turning it into valid JavaScript syntax for reconstituting an object at the other end of the transmission protocol.

MySQL is a relational database management system which relies on SQL for processing data in a database.

Parser is a component of a compiler that analyzes a sequence of tokens to determine its grammatical structure with respect to a given formal grammer. Parsing transforms input text into a data structure, usually a tree, which is suitable for later processing and which captures the implied hierarchy of the input. XML Parsers ensure that an XML document follows the rules of XML markup syntax correctly.

Platform is the combination of a client computer, an operating system, and a browser, which together can support Internet access and in particular the operation of interactive forms.

Presentation layer follows the structural layer, and provides instructions on how the document should look on the screen, sound when read aloud or be formatted when it is printed.

Rendering engine is software used with a Web browser that takes Web content (HTML, XML, image files) and formatting information (CSS, XSL) and displays the formatted content on a screen.

Serialization places an object in a binary form for transmission across a network such as the Internet and deserialization involves extracting a data structure from a series of bytes.

SQL (Structured Query Language) is a computer language designed for data retrieval and data management in a database.

Structural layer of a Web page is the marked up document and foundation on which other layers may be applied.

User is a client computer, generally operated by a human being, but in some system contexts running an automated process not under full-time human control.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

There are three types of JavaScript: 1) Client-side JavaScript; 2) Server-side JavaScript; and 3) Core JavaScript. Client-side JavaScript is generally an extended version of JavaScript that enables the enhancement and manipulation of web pages and client browsers. Server-side JavaScript is an extended version of JavaScript that enables back-end access to databases, file systems, and servers. Core JavaScript is the base JavaScript.

Core JavaScript includes the following objects: array, date, math, number and string. Client-side JavaScript and Server-side JavaScript have additional objects and functions that are specific to client-side or server-side functionality. Generally, any JavaScript libraries (.js files) created in core JavaScript can be used on both the client and the server without changes. Client-side JavaScript is composed of a Core JavaScript and additional objects such as: document, form, frame and window. The objects in Client-side JavaScript enable manipulation of HTML documents (checking form fields, submitting forms, creating dynamic pages) and the browser (directing the browser to load other HTML pages, display messages). Server-side JavaScript is composed of Core JavaScript and additional objects and functions for accessing databases and file systems, and sending email. Server-side JavaScript enables Web developers to efficiently create database-driven web applications. Server-side JavaScript is generally used to create and customize server-based applications by scripting the interaction between objects. Client-side JavaScript may be served by any server but only displayed by JavaScript-enabled browsers. Server-side JavaScript must be served by a JavaScript-enabled server but can be displayed by any browser.

United States Patent Application Publication Number 20010037359 describes a system and method for a server-side browser including markup language graphical user interface, dynamic markup language rewriter engine and profile engine. The system includes a user computer and a destination server computer separated by a server computer hosting a server-side browser (SSB). The SSB includes a markup language graphical user interface (MLGUI), a dynamic markup language rewriter engine (DMLRE) and a profiling engine (PE). The SSB may be configured as an intermediary infrastructure residing on the Internet providing customized information gathering for a user. The components of the SSB allow for controlling, brokering and distributing information more perfectly by controlling both browser functionality (on the client-side) and server functionality (on the destination site side) within a single point and without the necessity of incremental consents or integration of either side.

Rich Web applications and sites deliver great value but are hard to develop, deploy, and maintain. The client side of the application or site requires careful coordination of complex DHTML, JavaScript, and CSS. The APTANA IDE is designed to greatly ease the client side of this pain. But there is another difficult aspect to Ajax-style ("Web 2.0") applications: the server side. The developer must be an expert not only in a rich set of browser technologies and libraries, but also in a completely different set of paradigms on the server: a templating framework for emitting the HTML as a string, a different language such as Java or PHP or Ruby, and a variety of ways to communicate between the server-side technologies and the Web client. And these client- and server-centric technologies must be woven together into a seamless, flexible, maintainable product. If this isn't done right, the results are poor performance, excessive network load, difficulties measuring and monitoring the user experience, and constant headaches.

The current client-side paradigms are as follows. The key to developing modern, richly interactive web sites and applications is to start with the desired user experience and user interface ("UI"). Web application developers need to determine how information will be presented to the user and how will the user interact with it. Once a developer sketches out the basic information flow, several other high-level decisions become apparent: will this be a single page application or will there be page transitions; how much data will be available at any given time; how can the use control the data.

After defining the user interface, a developer can create a mockup to walk through the design. This becomes imperative for Web applications with rich interfaces, which require dynamic HTML mockups with working controls and realistic data. Increasingly, a developer will use one or more "Ajax libraries" to create a rich UI, styled with CSS. As a developer refines these client-side mockups, the Web page that the user will see takes shape.

The current server-side paradigms are as follows: Developing a client-side Web page is only part of the work involved in developing a rich internet application, however. Developers encounter a new set of questions as they complete the development of their application: where does the data for the client come from; how will changes to that data be persisted; how will multiple users share data.

Solving these issues requires a whole new set of technologies: the server side. For example, a server using PHP, Java, or Ruby, and often a templating framework, emits the HTML and the JavaScript needed for the client as one or more documents. The data needed by the client is then packaged into the page, usually by the templating framework writing JavaScript-format text. For rich web controls such as grids or calendars, the server-side templates cannot always emit exactly the HTML needed by the client-side Ajax library, so often the server will only emit an empty HTML container, and the client-side Ajax library must return to the server to fetch the data it needs to create the HTML for the control.

Client communication back to the server presents more issues. Ajax libraries simplify sending the data from the client, but then the server side must be set up to accept a large variety of requests and return the data in some format that the client can then read. Frequently, a templating framework writes (and converts it into a format that can be sent over a network protocol) PHP data into XML or JSON for transmission back to the client. Data validation on both the client and the server present even more issues, for example, how do you keep them in sync?

Current technologies that operate Server-side JavaScript fail to offer complete interactions which are the hallmark of rich Web sites and applications. While some existing technologies allow the use of JavaScript on the server, they do not offer a full HTML DOM (Document Object Model) on the server, nor the same rich interaction between JavaScript and that DOM that is the hallmark of rich Web sites and applications.

BRIEF SUMMARY OF THE INVENTION

The server computer program of the present invention directly addresses the difficulties of the prior art. The present invention offers a unified development model, in which the developer can continue to use exactly the same well-known paradigms from the client—JavaScript, the HTML DOM, and CSS—on the server, with no other server-side technologies. The server and client sides of the application or site can communicate easily and intuitively without any extra technologies to learn and incorporate. JavaScript functions on the client can simply call JavaScript functions on the server to fetch database information or, if needed, access back-end Java business objects and network resources. The DOM can be prepared on the server using the same Ajax libraries that will be used on the client when the page is delivered. The result is a much simpler and more efficient development process that lets Web developers focus on using Ajax technologies to deliver value. Indeed, an entire rich Web application can be written in a single HTML document. Since the present invention is based wholly on established Web standards, there is no reliance on proprietary markup or protocols. Applications and sites can now be built purely on Ajax technologies end to end, or the present invention can be used for just the presentation layer (both client and server) on top of a business logic layer in, for example, Java or PHP. The present invention is accepted within most information technology ("IT") network configurations: the present invention preferably comes with Apache so it can function as a full Web application/page server, and it can be integrated into an existing Web server farm, or it can be deployed as a proxy for maximal flexibility, for example post-processing an existing outbound HTML stream.

As a post-processor, the present invention can be used to intelligently instrument the outbound HTML stream for monitoring performance and user experience and behavior; to optimize the application (for example by aggregating JavaScript and CSS files to minimize network delays); to enforce security and compliance requirements; and even to add new capabilities that were not designed into the original application. This is made possible because the present invention understands the DOM, JavaScript, and CSS as natively as a browser. The present invention is preferably built on top of the Mozilla engine, the same engine used by the popular Firefox browser. The present invention affords an extensible and future-proof platform for building dashboards, optimizers, and compliance filters for use by IT and marketing organizations across multiple legacy Web applications. The knowledge gained can then be incorporated into new Web applications and sites developed more efficiently using the present invention.

The server technology of the present invention eliminates the complexity of using different technologies for client and server. With present invention, developers can use a single set of technologies the ones closest to their users: HTML, JavaScript, and CSS.

As always, the page the user will see starts on the server, but now this page can just be the same static page that was mocked up in the design phase. As a developer, you can designate some JavaScript to run on the server before the page is sent to the client, such as code that accesses a database to fill up a grid. One can also designate some of the JavaScript to remain on the server but be accessible from the client, such as code to update the database with new data from the client, or retrieve database data for refreshing the client. In this case, when the user interacts with the page to fire events, these events trigger client-side JavaScript that can directly call the functions designated to stay behind on the server.

The present invention enables a developer to use Ajax-style development end-to-end so a developer can even use the developer's favorite Ajax libraries for all of the development. This provides several key development benefits: the same code can prepare both the HTML DOM server side (for better perceived responsiveness) and modify it client-side (when the user changes the data or it's refreshed from the server); and using the same code on both the client and the sever, developers have fewer technologies to learn, and fewer parts of the application or site to maintain. With the present invention, code reuse between the client and server is fully realized, which is impossible, or virtually impossible, using the prior art.

The Present Invention overcomes the obstacles of the prior art by allowing for a complete interaction between JavaScript and DOM on the server side. The Present Invention is able to accomplish this by creating browser-like functions on the server-side. The Present Invention creates a new paradigm in which the server-side can accomplish browser functions including interpreting JavaScript, which opens up development opportunities. This allows a Web developer to apply on a server side the same skills, paradigms, libraries and other tools which are used for the client-side of the Web site of software application.

One aspect of the present invention is a method for using browser paradigms on a server. The method includes parsing a HTML of a document to create a HTML DOM on a server. Next, a JavaScript of the document is parsed and interpreted to create a parsed JavaScript, the JavaScript designated to operate on the server. The HTML DOM is modified with the parsed JavaScript on the server.

Another aspect of the present invention is a system for web development. The system includes a server, means for parsing a HTML of a document to create a HTML DOM on the server, means for parsing and interpreting a JavaScript of the document to create a parsed JavaScript, the JavaScript designated to operate on the server, and means for modifying the HTML DOM with the parsed JavaScript on the server.

Yet another aspect of the present invention is a Web environment. The web environment includes a Web-server side and a Web-client side. The web-server side includes a HTTP server, a handler in communication with the HTTP server, and a server architecture in communication with the handler. The server architecture includes means for filtering a HTML page, means for parsing the HTML page to create a HTML DOM, means for parsing and interpreting a JavaScript of the HTML page, means for accessing a database, means for accessing a filesystem, means for accessing a network, means for serializing the DOM back into the HTML page, and means for injecting proxies.

The Web-client side preferably includes a graphical user interface, a browser for transmitting a HTTP request to the HTTP server, a JavaScript code, and a rendering engine for rendering the JavaScript code for display on the graphical user interface.

Yet another aspect of the present invention is a computer program product for a server. The computer program product includes means for filtering a HTML page, means for parsing the HTML page to create a HTML DOM, means for parsing and interpreting a JavaScript of the HTML page, means for accessing a database, means for accessing a filesystem, means for accessing a network, means for serializing the DOM back into the HTML page, and means for injecting proxies.

Yet another aspect of the present invention is a web environment including a Web-server side and a Web-client side. The Web-server side includes a HTTP server, a handler in communication with the HTTP server, a server architecture in communication with the handler. The server architecture includes means for filtering a HTML page, means for parsing the HTML page to create a HTML DOM, means for parsing and interpreting a JavaScript (internal or external or programatically included) of the HTML page, means for allowing the JavaScript to interact with and modify the HTML DOM, means for parsing and interpreting a CSS stylesheet (internal or external or programatically included) of the HTML page, means for accessing a database, means for accessing a file-system, means for accessing a network, means for serializing the DOM back into an HTML page, and means for injecting proxies and other artifacts needed for processing the HTML page on the Web-client. The Web-client side includes a graphical user interface, a browser for transmitting a HTTP request to the HTTP server, a JavaScript code, a JavaScript and DOM engine for processing the HTML and CSS and JavaScript into a DOM and allowing the JavaScript to interact with this DOM, and a rendering engine for rendering the HTML and CSS for display on the graphical user interface.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 6 is a Web-page generated by the code.

DETAILED DESCRIPTION OF THE INVENTION

Figure 1:
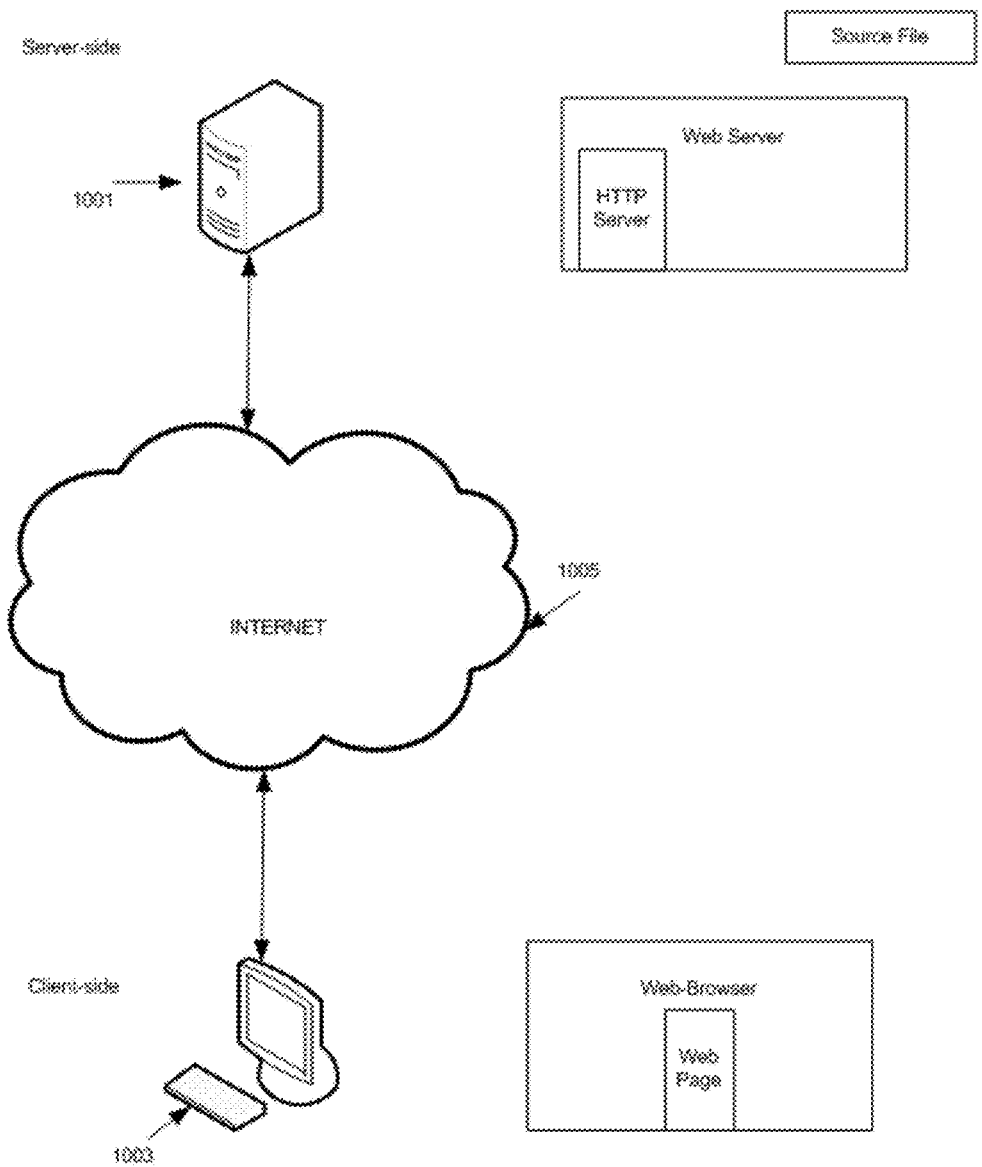
FIG. 1 is a block diagram of a web system of the prior art.
Figure 2:
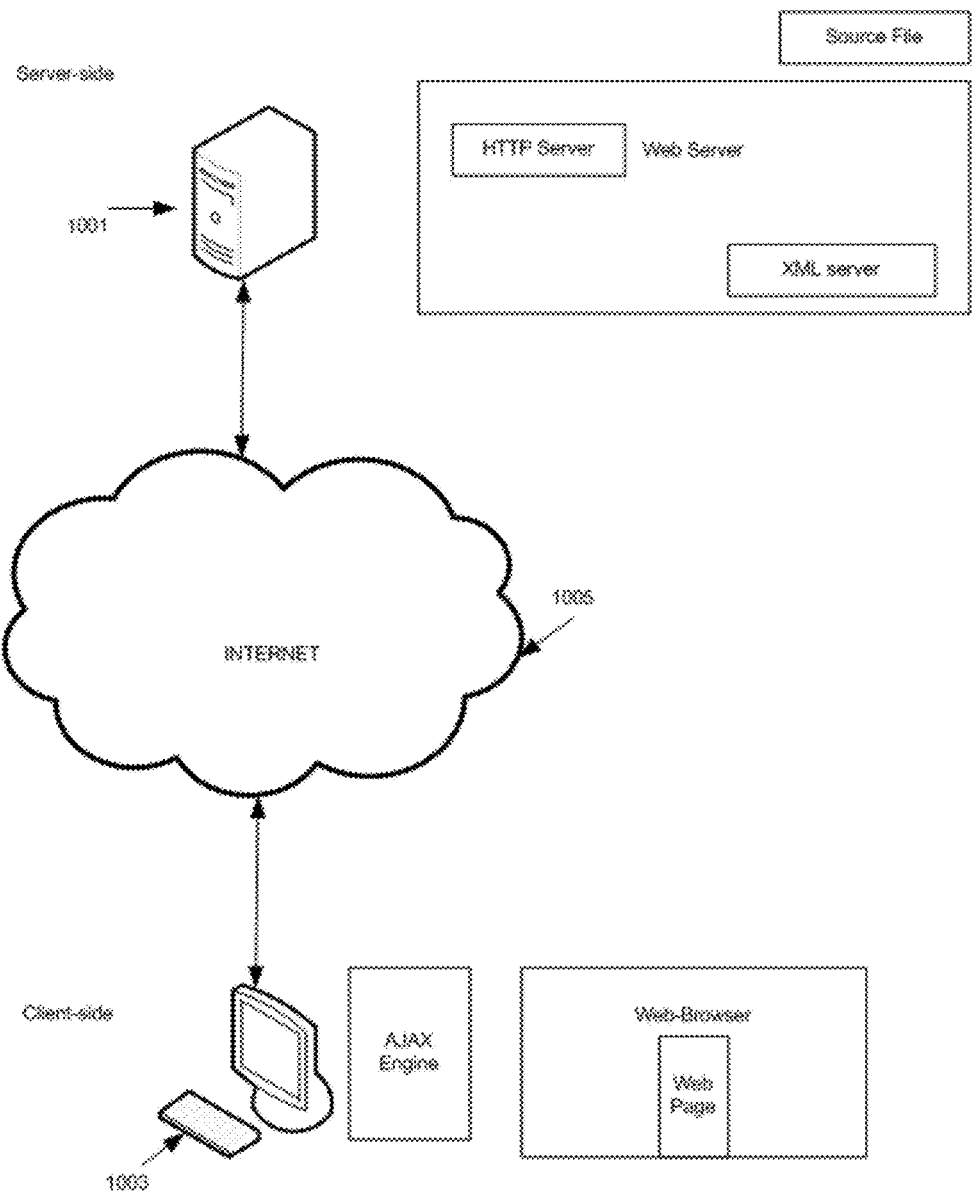
FIG. 2 is a block diagram of a web system of the prior art.
Figure 3:
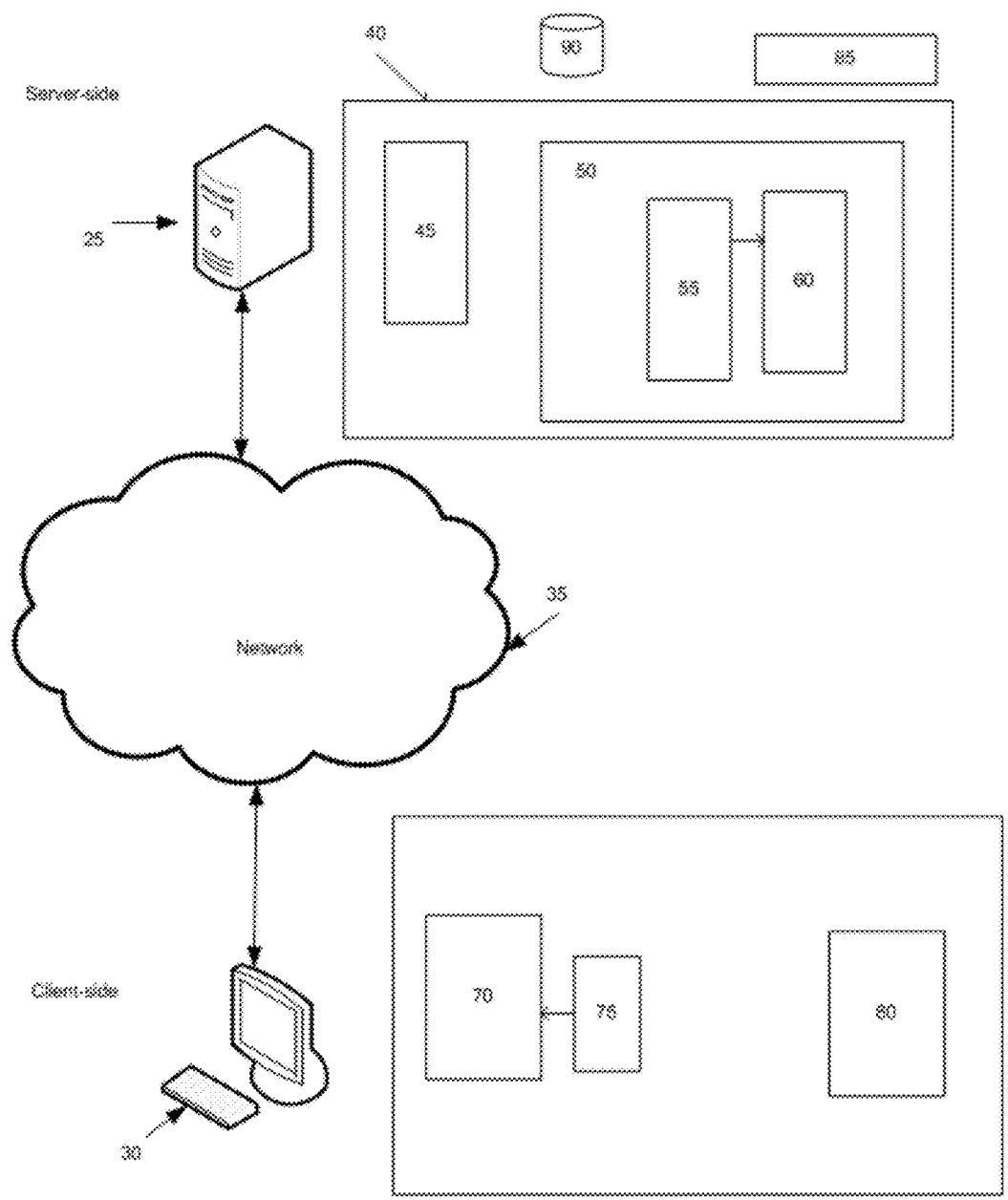
FIG. 3 is a block diagram of the system of the present invention during a callback.

As shown in FIG. 3 a system 20 of the invention generally includes a server-side 25, a client side 30 and a network or preferably the Internet 35. The server-side 25 includes a web-server 40, a handler 45 and a JavaScript server 50 preferably having a server-core 55 and a server-framework 60. The client-side 30 includes a Web-browser 65 has a client-framework 70, a client-side JavaScript code 75 and a rendering engine 80. The server-framework 60 accesses filesystems 85 and databases 90, as well as the Internet 35.

In FIG. 3, the system 20 is shown during a callback operation. The callback begins at the client-side JavaScript code 75 with a callback request sent to the client-framework 70. A HTTP GET/request is transmitted over the Internet 35 to the server-side 25, and received at the Web-server 40. The HTTP GET/request is sent to the server-core 55 which sends the HTTP GET/request as a callback to the server-framework 60. The server-framework 60 receives the callback, deserializes, performs the get functions, invokes, serializes and sends the response to the callback to the server-core 55. The server-core 55 sends the response to the Web-server 40 which sends the response over the Internet 35 to client-framework 70 on the Web-browser 65.

Figure 4:
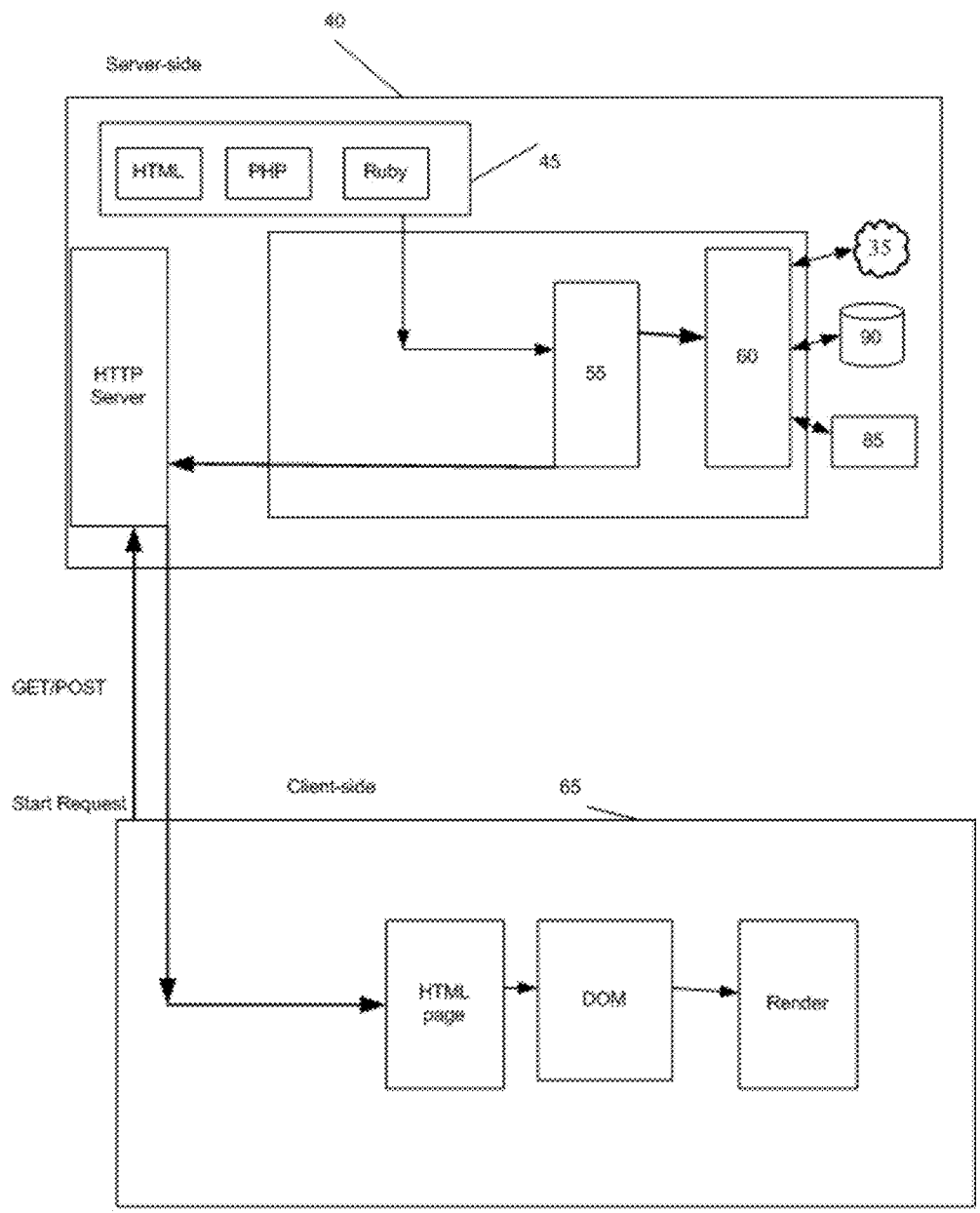
FIG. 4 is a block diagram of the system of the present invention during a normal process.

In FIG. 4, the system 20 is shown during a normal process. The process begins with a HTTP GET/request for a Web-page sent over the Internet 35 from the Web-browser 65 on the client-side 30 to the server-side 25. The HTTP Request is sent to the handler server 45. The HTML web-page is then sent to the server architecture 50. The server-core 55 of the server architecture 50 parses the HTML Web-page to create a HTML DOM of the HTML Web-page. The server-core 55 also parses and interprets the JavaScript of the HTML Web-page. The server-framework 60 accesses databases 90 and filesystems 85 to respond to the Requests for the HTML Web-page. The server-framework 60 also injects proxies to modify the HTML Web-page. The server-core 55 serializes the DOM back to the HTML Web-page and the web-server 40 transmits the HTML Web-page to the client-side 30 where the Web-browser 65 renders the HTML Web-page for display for a user.

Figure 5:
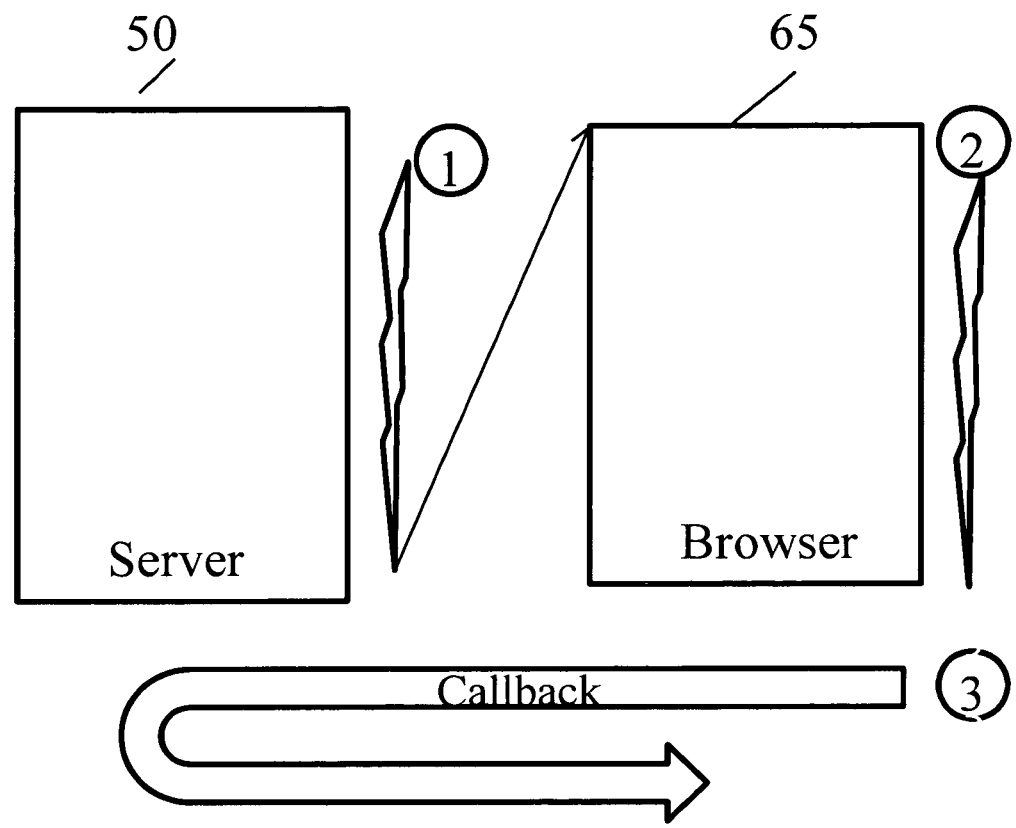
FIG. 5 is a block diagram of a callback process.

As shown in FIG. 5, the present invention allows the server 50 to execute the JavaScript functions that are set to runat="server" or runat="both". These functions might call databases, file systems, communicate across network sockets, or get session data. And since the server-side engine has a HTML DOM just like the browser, the HTML page can be manipulated through standard DOM APIs and your favorite Ajax libraries. The present invention also has session objects that can be used to persist data for users during a session or transaction. Any functions set to runat="server" are stripped from what gets sent to the browser 65. Specifically at 1, the page executes on the server 50 and a resulting HTML page is sent to the browser 65.

After server 50 sends the resulting HTML page to the browser 65, at 2 the browser 65 interprets the HTML page and executes the JavaScript within the HTML page. If JavaScript functions tagged to runat="server-proxy" are included, then the present invention automatically strips out the bodies of those functions and replaces the bodies with a new functions by the same name that know how to invoke the original function on the server 50 using Ajax calls and return the result either synchronously or asynchronously. Ajax communications do not need to be written using the present invention. Any functions not tagged with a runat attribute or set to runat="client" or runat="both" are processed by the browser 65.

Any functions set to runat="server-proxy" can now be called from the browser 65. The function is called as if it were running on the browser 65, and the present invention, automatically via XHR communications with the server 50, marshals the parameters to the server 50 where the function executes (calling databases, getting info from the session data, etc. . . . ) and returns the result to the browser 65. The "server-proxy" functions can be invoked either synchronously or asynchronously. At 3, the browser 65 calls the server 50 asynchronously for new information.

The server computer program of the present invention is pre-configured for preferable use as a plug-in to the APACHE 2.x web server. To provide standards-compliant JavaScript and DOM capabilities server-side, the server computer program is built on the MOZILLA engine, which is the same engine used in the popular FIREFOX browser. The server computer program of the present invention is layered into APACHE as an input and output filter for use to modify dynamic pages created by other languages, such as PHP or Ruby.

The server computer program of the present invention is preferably a combination of C/C++ "Core" code and a server-side JavaScript "Framework." The server-core 55 provides the JavaScript parser and runtime, HTML parser and DOM engine, and an event architecture that calls the server-framework 60 as the document is being processed on the Web-server 25. The server-framework 60 provides the logic, for example deciding which code to run on the server-side 25 and which on the client-side 30, creating proxies on the client-side 30 for callable server-side functions, serializing and deserializing data, and other related activities.

On the server side 25, a developer's JavaScript environment is enhanced by the server-framework 60, which provides access to the database (e.g., MySQL), file system, network, the HTTP Request and Response data, and the external server-side platforms such as Java, PHP, and Ruby.

An example of code written by a developer and prior to processing by the present invention is set forth below.

```
<html>
   <head>
   <title>Tasks</title>
   <style>
      body {font: 9 pt Arial; float: left;}
      .tasks {background-color: #f0f0ff; padding: 8px;}
      .new-task {Padding-bottom: 8px;}
      .task {Padding: 4px;}
   </style>
   <script type="text/javascript" runat="server">
      Var sql="CREATE TABLE IF NOT EXISTS tasks ("+
         "id int (11) NOT NULL,"+
         "description varchar (255),"+
         "created datetime NOT NULL"+
         ") ENGINE=InnoDB DEFAULT CHARSET=utf8;
      Aptana.DB.execute(sql);
      Window.onserverload=function( )
      {
var      resultSet=Aptana.DB.execute("SELECT*FROM
         tasks ORDER BY created");
for (var i=0; i<resultSet.rows.length; i++)
{
var task=resultSet.rows[i];
addTask(task.description, task.id);
}
}
function saveTask(id, description)
{
var      resultSet=Aptana.DB.execute("SELECT*FROM
   tasks WHERE id=?", [id]);
if (resultSet.rows.length>0)//task already exists
{
Aptana.DB.execute("UPDATE tasks SET description=?
   WHERE id=?",
   [description, id]);
}
else//insert new task
{
Aptana.DB.execute("INSERT INTO tasks (id, description, created)"+
   "VALUES (?, ?, NOW( ))",
   [id, description]);
}
}
saveTask.proxy=true;
function $(id) {return document.getElementById(id);}
$.runat="both";
function addTask(description, id)
{
var newId=id||Math.ceil(1000000000*Math.random( ));
var div=document.createElement("div");
div.id="task_"+ newId;
div.className="task";
var checkbox=document.createElement("input");
checkbox.setAttribute("type", "checkbox");
checkbox.setAttribute("title", "done");
checkbox.setAttribute("id", "checkbox_"+ newId);
```

```
    Aptana.setEvent(checkbox, "onclick", "completeTask("+
newId+")");
    div.appendChild(checkbox);
    var input=document.createElement("input");
    input.setAttribute("type", "text");
    input.setAttribute("size", "60");
    input.setAttribute("title", "description");
    input.setAttribute("id", "input_"+ newId);
    input.setAttribute("value", description);
    Aptana.setEvent(input, "onchange", "saveTask("+
newId+", this.value)");
    div.appendChild(input);
    $("tasks").insertBefore(div, $("tasks").firstChild);
    if (!Aptana.is OnServer)
    {
    saveTask(newId, description);
    }
    }
    addTask.runat="both";
    function completeTask(taskId)
    {
    var div=$("task_"+ taskId);
    div.parentNode.removeChild(div);
    delete SavedTask(taskId);
    }
    completeTask.runat="client";
    function deleteSavedTask(id)
    {
    Aptana.DB.execute("DELETE FROM tasks WHERE
id=?", [id]);
    }
    deleteSavedTask.proxy=true;
    </script>
</head>
<body>
    <h2>Tasks To Do</h2>
    <div><i>Any changes should be automatically saved to
your database!</i><br/><br/></div>
    <div class="new-task">
    New:
    <input type="text" id="txt_new" size="60">
    <input type="button" value="add" onclick="addTask($
('txt_new').value)">
    </div>
    <div id="tasks" class="tasks">
    </div>
</body>
</html>
    Processing of the code by the present invention results in
        the code being formatted as set forth below:
    <html>
    <head>
    <script src="/aptanaframework.js?version=0.1.1.759"
type="text/javascript"></script>
    <script type="text/javascript">Aptana.clientData=
Aptana.Serialization.fromJSONString('{ }');</script>
    <script type="text/javascript">Aptana.Callback.id=-
1407728339;</script>
    <title>Tasks</title>
    <style>
    body {
    font: 9 pt Arial;
    float: left;
    }
    .tasks {
    background-color: #f0f0ff;
    padding: 8px;
    }
    .new-task {
    padding-bottom: 8px;
    }
    .task {
    padding: 4px;
    }
    </style>
    <script type="text/javascript">
    function $(id)
    {
    return document.getElementById(id);
    }
    function addTask(description, id)
    {
    var newId=id||Math.ceil(1000000000*Math.random( ));
    var div=document.createElement("div");
    div.id="task_"+ newId;
    div.className="task";
    var checkbox=document.createElement("input");
    checkbox.setAttribute("type", "checkbox");
    checkbox.setAttribute("title", "done");
    checkbox.setAttribute("id", "checkbox_"+ newId);
    Aptana.setEvent(checkbox, "onclick", "completeTask("+
newId+")");
    div.appendChild(checkbox);
    var input=document.createElement("input");
    input.setAttribute("type", "text");
    input.setAttribute("size", "60");
    input.setAttribute("title", "description");
    input.setAttribute("id", "input_"+ newId);
    input.setAttribute("value", description);
    Aptana.setEvent(input, "onchange", "saveTask("+
newId+", this.value)");
    div.appendChild(input);
    $("tasks").insertBefore(div, $("tasks").firstChild);
    if (!Aptana.isOnServer)
    {
    saveTask(newId, description);
    }
    }
    function completeTask(taskId)
    {
    var div=$("task_"+ taskId);
    div.parentNode.removeChild(div);
    deleteSavedTask(taskId);
    }
    function saveTask( )
    {
    return    Aptana.Callback.invokeFunction.call(null,
"saveTask", arguments);
    }
    function saveTaskAsync(callback)
    {
    return   Aptana.Callback.invokeFunctionAsync.call(null,
callback, "saveTask", arguments);
    }
    function deleteSavedTask( )
    {
    return Aptana.Callback.invokeFunction.call(null, "delete-
SavedTask", arguments);
    }
    function deleteSavedTaskAsync(callback)
    {
    return   Aptana.Callback.invokeFunctionAsync.call(null,
callback, "deleteSavedTask", arguments);
    }
```

```
</script>
</head>
<body>
    <h2>Tasks To Do</h2>
    <div>
    <i>Any changes should be automatically saved to your database!</i>
    <br>
    <br>
    </div>
    <div class="new-task">
    New:<input id="txt_new" size="60" type="text"><input value="add" onclick="addTask($('txt_new').value)" type="button">
    </div> div id="tasks" class="tasks"

</div>
    </body>
</html>
```

FIG. 6 is a screen display 99 of the code set forth above.

Figure 7:
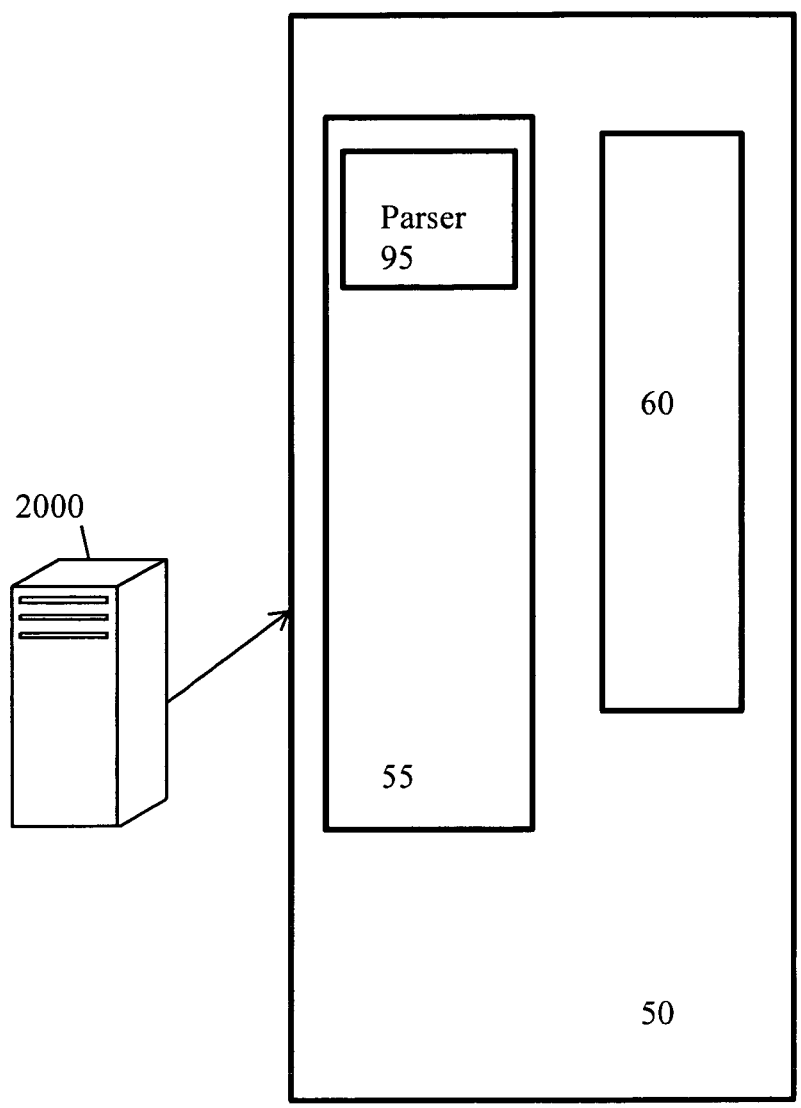
FIG. 7 is a block diagram of the server of the system of the present invention.

As shown in FIG. 7, a server-computer 2000 contains server architecture 50. The server-architecture 50 includes the server-core 55 and the server-framework 60. The server-core 55 includes a JavaScript parser 95. The server-computer 2000 is preferably a conventional server-computer available from IBM, HP, APPLE, DELL, and SUN.

Figure 7A:
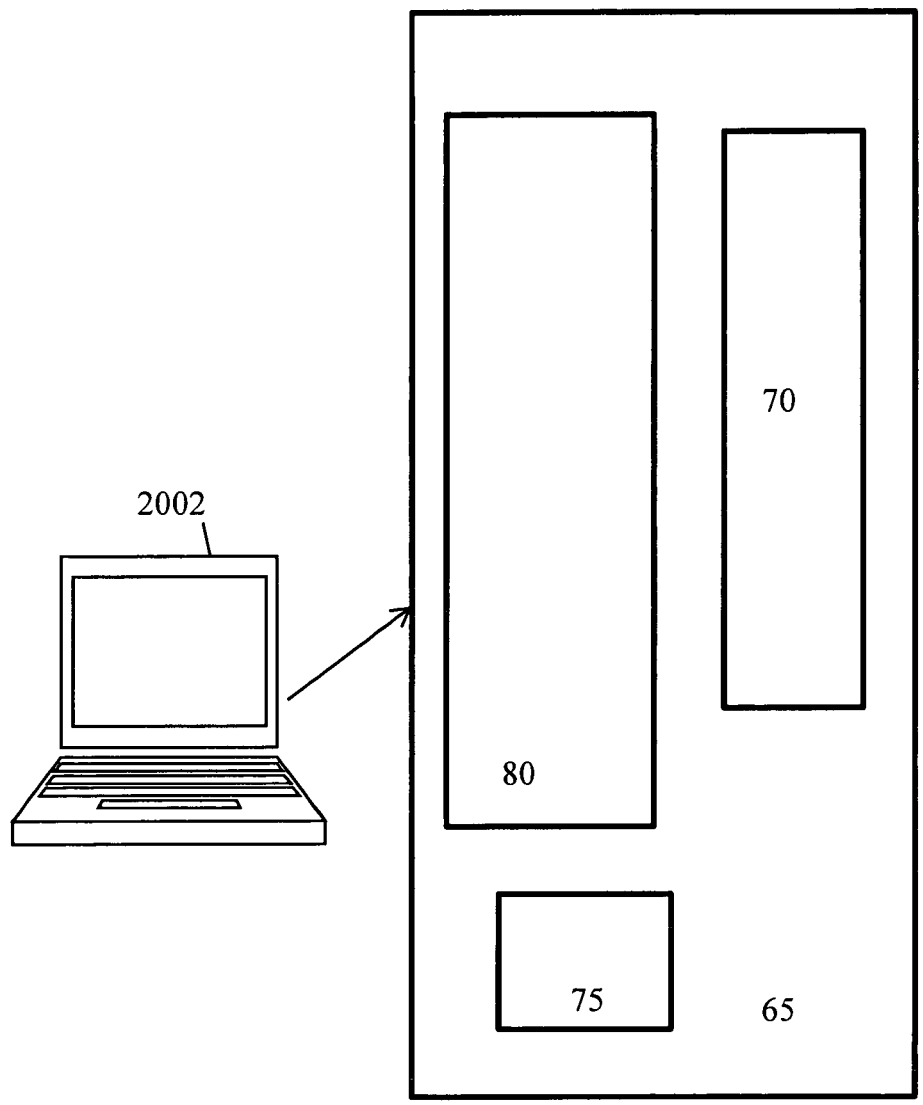
FIG. 7A is a block diagram of the user-computer of the system of the present invention.

As shown in FIG. 7A, a user-computer 2002 contains a Web-browser 65. The Web-browser 65 preferably includes the client framework 70, client-side JavaScript code 75 and the rendering engine 80. The user-computer 2002 is preferably a conventional user-computer such as a PC available from HP, DELL, and GATEWAY, or a MAC available from APPLE. The Web-browser 65 is preferably MICROSOFT INTERNET EXPLORER, NETSCAPE, APPLE SAFARI, MOZILLA FIREFOX, or OPERA.

Figure 8:
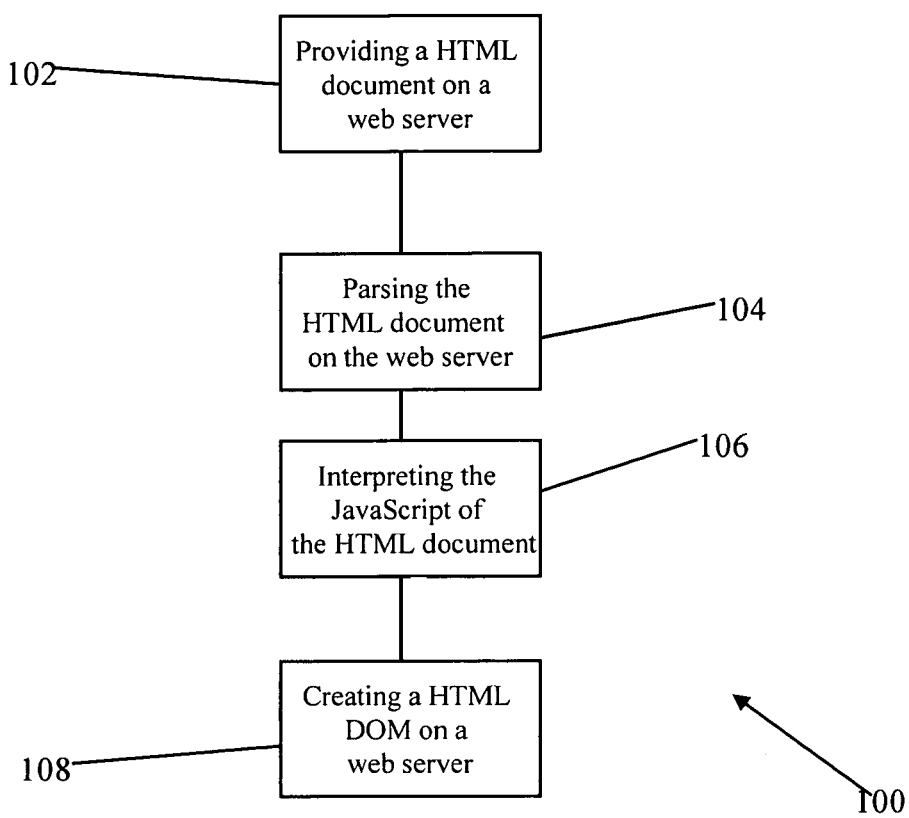
FIG. 8 is a flow chart of a general method of the present invention.

A general method 100 of the present invention is shown in FIG. 8. At block 102, a HTML document is provided on a Web server. At block 104, the HTML document is parsed on the Web-server. At block 106, the JavaScript of the HTML document is interpreted on the Web-server. At block 108, an HTML DOM is created on the Web-server.

Figure 9:
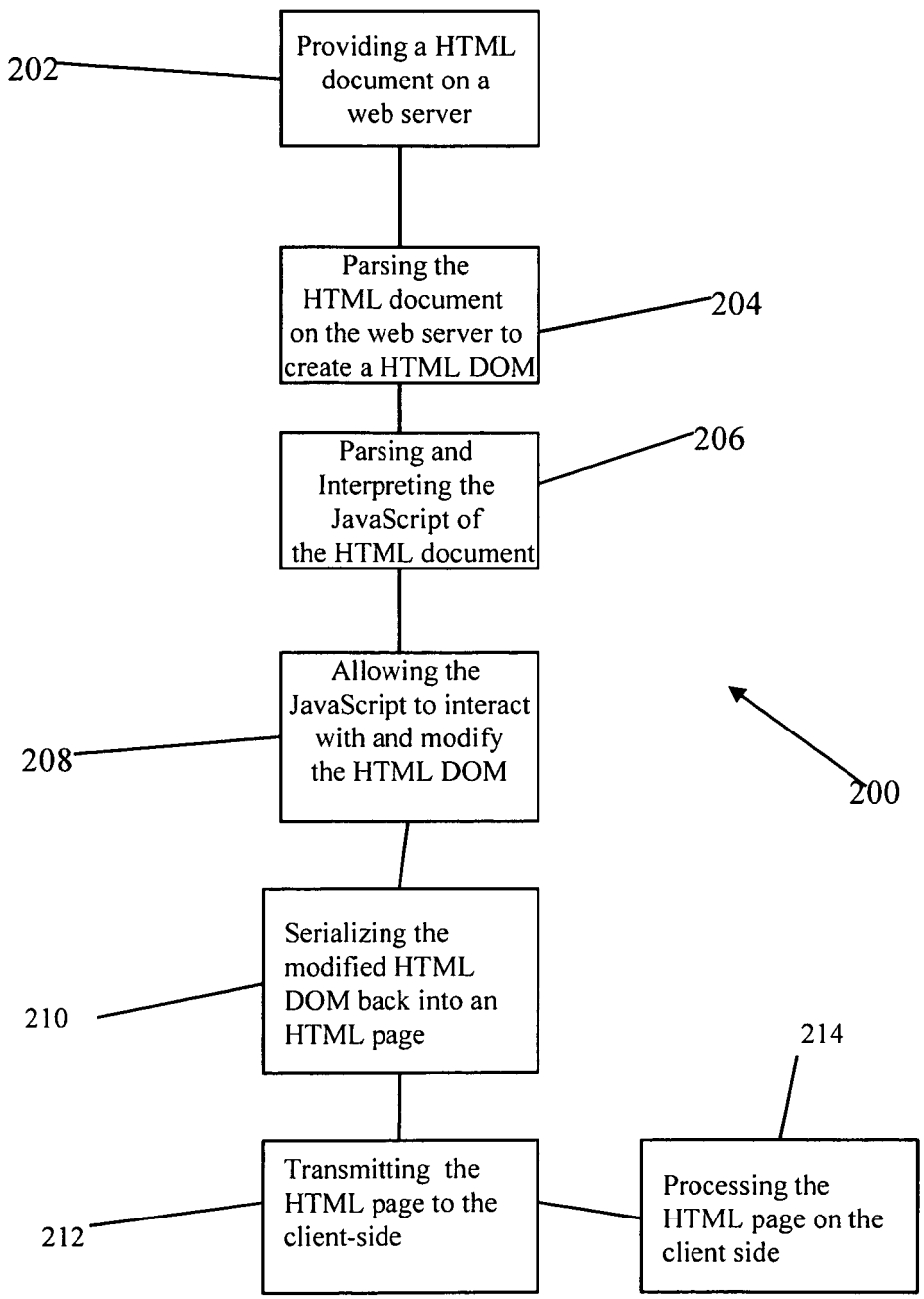
FIG. 9 is a flow chart of a specific method of the present invention.

A more specific method 200 of the present invention is shown in FIG. 9. At block 202, a HTML document is provided on a Web-server. At block 204, the HTML document is parsed on the Web-server to create an HTML DOM. At block 206, the JavaScript of the HTML document is parsed and interpreted on the Web-server. At block 208, the JavaScript interacts with and modifies the HTML DOM. At block 210, the HTML DOM is serialized back to HTML. At block 212, the HTML page is transmitted to the client-side over the Internet. At block 214, the HTMPL page is interpreted on the Web-browser for display on the user computer.

Figure 10:
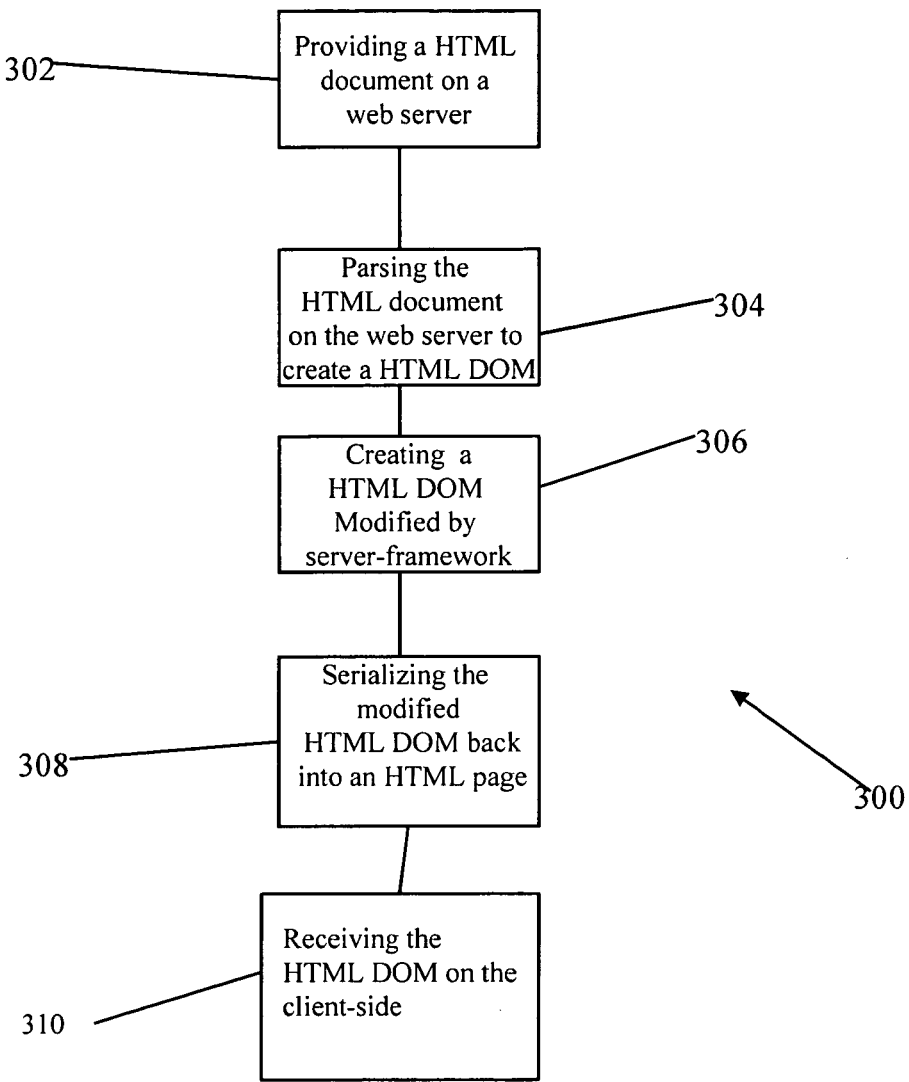
FIG. 10 is a flow chart of a specific method of the present invention.

Another specific method 300 of the present invention is illustrated in FIG. 10. At block 302, an HTML document starts life on the server, either as a static HTML file read from disk, or as a dynamic page generated by PHP, Ruby, Java, etc. At block 304, the server core 55 receives the HTML document as an output (post-process) filter from APACHE, and starts to parse and execute the HTML document, similar to a browser. The server-core 55 creates and populates the DOM, executes the JavaScript code designated to run on the server-side 25, and continues until the entire HTML document is completed. At block 306, a DOM modified by the server-framework 60 and by the developer is created on the server-side 25. The modifications in particular include proxies that automatically replace server-side client-callable functions. At block 308, the new DOM is serialized as an HTML document on the server-core 55 and streamed out to the client-side 30. At block 310, the client-side receives the HTML document and the processing continues, recreating the DOM from HTML document and executing the remaining client-side JavaScript.

Example

The following example pertains to adding server-side functionality to tasks using the server architecture of the present invention.

This example uses MySQL to save and retrieve tasks data. The server framework 60 provides access to MySQL. The server framework 60 is accessible within an Aptana namespace (JavaScript global object) server-side, and a small part of it is also inserted into the Aptana namespace client-side. The server framework 60, to minimize name collisions, defines no other global variables.

First, one creates the database table to store the tasks, if it isn't already created. Add a runat="server" attribute to the <script> block and add the following code
Var sql="CREATE TABLE IF NOT EXISTS tasks ("+
"id int (11) NOT NULL,"+
"description varchar(255),"+
"created datetime NOT NULL"+
") ENGINE=InnoDB DEFAULT CHARSET=ut f8":
Aptana.DB.execute (sql);

Of note, when one calls Aptana.DB.execute( ) the default connection settings are used as defined in config.js, e.g. using the "demos" database specified in the default config.js that accompanies the computer program of the present invention. If the default config.js database does not yet exist, it will be created automatically when server architecture serves the first page.

Next, with the adding server-side functionality, code is added to populate the DOM on the server with any saved tasks, before the page is sent to the client-side. This code executes after the DOM has been loaded into the server, so the code is added into a window.onserverload event handler, similar to using a window.onload handler. A SQL SELECT query is used to read the tasks from the database into a resultSet object, and iterate over its rows. For each task row, a task is added to the DOM using the same code as on the client as shown below.
window.onserverload=function( )
{
Var resultset=Aptana.DB.execute ("SELECT*FROM tasks ORDER BY created");
for (var I=0; i<resultSet.rows.length; I++)
( var task=resultSet.rows [i];
    addTask (task.description, task.id);
}
)

Of note, usually addTask uses a third-party Ajax library to create and add the DOM fragment for the task. Because both the DOM and JavaScript are on the server, one can use exactly the same addTask with the same Ajax library also on the server-side, and ensure that the HTML emitted from the server-side is exactly what is needed by the client-side. This is accomplished by setting addTask.runat="both" or placing it in a <script runat="both"> block.

Next with the adding server-side functionality, a server-side function, as shown below, is added to save a task, updating or inserting it as necessary, and making it callable from the client-side.

```
function saveTask (id, description)
{
    var resultSet=Aptana.DB.execute("SELECT*FROM
tasks WHERE id=?", [id]);
    if (resultSet.rows.length>0)//task already exists
    {
    Aptana.DB.execute("UPDATE tasks SET description=?
      WHERE id=?υ,
      [description, id]);
    }
    else//insert new task
    {
    Aptana.DB.executeCINSERT INTO tasks (id, description,
      created)"+
      [id, description]);
    }
}
saveTask.runat="server-proxy";
```

Of note, the capability of DB.execute should be used for the present invention. For example, instead of embedding input values into the SQL itself which could expose your code to SQL injection attacks, a developer should use question marks and pass in an array of values to be substituted respectively for the question marks. This will also eliminate the need to escape the input values.

Next with the adding server-side functionality, the code to call saveTask within addTask from the client whenever a task is added is set up. Also this is called when the task description changes by adding it to the onchange handler on the <input> box of each task. These are created by addTask, which is shown below.

Next with adding server-side functionality, in order to use addTask on the server, the $(id) helper function is needed on the server, so $.runat="both"; is added to the code as shown in below.

```
    function addTask(description, id)
    {
    var newId=id||Math.ceil(1000000000*Math.random( ));
    var div=document.createElement("div");
    div.id="task_"+ newId;
    div.className="task";
    var checkbox=document.createElement("input");
    checkbox.setAttribute("type", "checkbox");
    checkbox.setAttribute("title", "done");
    checkbox.setAttribute("id", "checkbox_"+ newId);
    Aptana.setEvent(checkbox, "onclick", "completeTask("+
newId+")");
    div.appendChild(checkbox);
    var input=document.createElement("input");
    input.setAttribute("type", "text");
    input.setAttribute("size", "60");
    input.setAttribute("title", "description");
    input.setAttribute("id", "input_"+ newId);
    input.setAttribute("value", description);
    Aptana.setEvent(input, "onchange", "saveTask("+
newId+", this.value)");
    div.appendChild(input);
    $("tasks").insertBefore(div, $("tasks").firstChild);
    if (!Aptana.isOnServer)
    {
    saveTask(newId, description);
    }
    }
addTask.runat="both";
```

Finally, with adding server-side functionality, when a task is checked off as done, it is deleted from the client-side and server-side. Change completeTask to call a new server-side, client-proxied deleteSavedTask function as shown below.

```
function completeTask(taskId)
{var div=$("task_"+ taskId);
div.parentNode.removeChild(div);
deleteSavedTask(taskId);}
completeTask.runat="client";
function deleteSavedTask(id)
{Aptana.DB.execute("DELETE FROM tasks WHERE
id=?", [id]);}
deleteSavedTask.proxy=true;
```

This final step completes the application. A simple Ajax tasks manager is built entirely in one Web page using only standard, Web-native paradigms, HTML, JavaScript, and CSS, with a bit of SQL on the server and some new JavaScript server-side functionality. The server modifies the HTML DOM based on some JavaScript code and the database. The server also adds a few proxy functions and sends the proxy functions to the client. The client allows the user to modify it based on new information using the same code, and seamlessly calls the server back to persist the changes to the database.

The lifecycle of a Web page using the present invention begins with the HTML document on a server, either as a static HTML file read from disk, or as a dynamic page generated by PHP, Ruby, Java, or like languages. The server architecture receives the HTML document as an output (post-process) filter from APACHE, and starts to parse and execute the HTML document. The server architecture creates and populates the DOM, executes the JavaScript code designated to run on the server, and continues until the entire HTML document is consumed. The result of this activity on the server is a DOM modified by the server framework and by the developer. In particular, proxies automatically replace server-side client-callable functions. Designated JavaScript functions are preferably stored as callbacks and persisting session-type data. The new DOM, (modified DOM) is serialized as an HTML document and streamed out to the client in a conventional manner. The client receives the HTML document and the processing continues, recreating the DOM from the HTML and executing client-side JavaScript remaining in the page. When one of the client-side proxy functions is called, its parameters are automatically serialized into a JSON format, and an XML HttpRequest is sent to the server to invoke the original function with these parameters. At the server, the parameters are deserialized, the function to be invoked is restored and called with these parameters, and the results are serialized into JSON. The data is returned to the client, where it is deserialized and returned as the result of the proxy.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for using browser paradigms on a server implementing Asynchronous and JavaScript XML (Ajax), the method comprising:
   providing the HTML document to the server;
   parsing a hypertext markup language ("HTML") document to create an HTML document object model ("DOM") on a server using Ajax libraries used on a client receiving the HTML document;
   parsing and interpreting JavaScript of the HTML document on the server to create a parsed JavaScript on the server, a portion of the parsed JavaScript being designated to operate on the server through a JavaScript runat attribute indicating execution of the function on the server or on both the client and the server;
   setting an add task function to execute on both the client and server so that the function uses the same Ajax library on the client side and server side to ensure that HTML data transmitted from the server-side is exactly what is needed by the client-side:
   modifying the HTML DOM by executing the portion of the parsed JavaScript on the server to create a modified HTML DOM on the server; and
   transmitting the modified HTML DOM from the server on a server-side of a network to the client on a client-side of the network.

2. The method according to claim 1 further comprising serializing the modified HTML DOM into a modified HTML document.

3. The method according to claim 2 further comprising transmitting the modified HTML document to a client.

4. The method according to claim 1 wherein providing the HTML document comprises generating a dynamic page from a different programming language configured to output the HTML document.

5. The method according to claim 1 further comprising populating the HTML DOM on the server.

6. A system for Web application development using Asynchronous and JavaScript XML (Ajax), comprising:
   a server computer configured to:
   providing the HTML document to the server;
   parse a hypertext markup language ("HTML") document to create an HTML document object model ("DOM") on the server using Ajax libraries used on a client receiving the HTML document;
   parse and interpret JavaScript of the HTML document to create a parsed JavaScript on the server, a portion of the parsed JavaScript being designated to operate on the server through a JavaScript runat attribute indicating execution of the function on the server or on both the client and the server;
   setting an add task function to execute on both the client and server so that the function uses the same Ajax library on the client side and server side to ensure that HTML data transmitted from the server-side is exactly what is needed by the client-side;
   modifying the HTML DOM by executing the portion of the parsed JavaScript on the server to create a modified HTML DOM on the server; and
   transmitting the modified HTML DOM from the server on a server-side of a network to the client on a client-side of the network.

7. The system according to claim 6 further comprising:
   a computer program product that, when executed by the server, causes the server to parse the HTML document, parse and interpret the JavaScript of the HTML document, and modify the HTML DOM.

8. The system according to claim 7, wherein the computer program product, when executed by the server, causes the server to: filter the HTML document; access a database; access a network; serialize the modified HTML DOM back into a modified HTML document; and inject proxies into the modified HTML DOM.

9. A Web environment comprising:
   a hypertext transfer protocol ("HTTP") server on a server-side of a network using Asynchronous and JavaScript XML (Ajax),
   a handler in communication with the HTTP server,
   a server computer architecture in communication with the handler, the server architecture configured to:
   provide the HTML document to the server;
   filter a hypertext markup language ("HTML") page,
   parse the HTML page to create an HTML document object model ("DOM") using Ajax libraries used on a client receiving the HTML document,
   parse and interpret JavaScript of the HTML page to create a parsed JavaScript on the HTTP server, a portion of the parsed JavaScript being configured to execute on the HTTP server through a JavaScript runat attribute indicating execution of the function on the server or on both the client and the server,
   set an add task function to execute on both the client and server so that the function uses the same Ajax library on the client side and server side to ensure that HTML data transmitted from the server-side is exactly what is needed by the client-side;
   modify the HTML DOM by executing the portion of the parsed JavaScript on the server to create a modified HTML DOM on the server; and
   transmit the modified HTML DOM from the server on the server-side of the network to the client on a client-side of the network.

10. The method of claim 1 further comprising: receiving the HTML document at the server.

11. The method of claim 1 further comprising:
    replacing at least one original function of the JavaScript of the HTML document with a proxy function in the modified HTML document, wherein the proxy function allows a client to call the at least one original function to be executed on the server.

12. The method of claim 11, wherein the proxy function allows the client to call at least one original function to be executed asynchronously on the server.

13. The method of claim 4, wherein the different language is one selected from the group of Java, PHP, and Ruby.

14. The method of claim 1, wherein the step of modifying the HTML DOM comprises adding at least a part of the parsed JavaScript to the modified HTML DOM.

15. The method of claim 14, wherein the part of the parsed JavaScript comprises the portion of the parsed JavaScript.

16. The Web environment of claim 9 further comprising:
    a client on a client-side of the network comprising:
    a display,
    a browser engine for transmitting an HTTP request for the HTML page to the HTTP server, and
    a rendering engine for rendering JavaScript code in the modified HTML page for display of a graphical user interface on the display of the client.

17. The Web environment of claim 9, wherein the server architecture is configured to:
    identify any functions of the JavaScript of the HTML page configured to execute on the HTTP server and to be called by a client on the client-side of the network; and replace each of the functions with a proxy function that allows the respective function to be called by the client to execute the respective function on the HTTP server.

18. The Web environment of claim 9, wherein the server architecture is configured to: access a database, access a file system, and access the network.

19. The Web environment of claim 9, wherein the server architecture is configured to:
    serialize the modified HTML DOM into a modified HTML page, and
    transmit the modified HTML page to a client on the client-side of the network that requested the HTML page.

20. The Web environment of claim 9, wherein the server architecture is configured to:
    replace at least one original function of the JavaScript of the HTML page with a proxy function in the modified HTML page, wherein the proxy function allows a client on a client-side of the network to call the at least one original function to be executed on the HTTP server.

* * * * *